United States Patent
Sundaram et al.

(10) Patent No.: US 10,044,632 B2
(45) Date of Patent: Aug. 7, 2018

(54) SYSTEMS AND METHODS FOR ADAPTIVE CREDIT-BASED FLOW

(71) Applicant: DELL PRODUCTS L.P., Round Rock, TX (US)

(72) Inventors: Shivakumar Sundaram, Chennai (IN); Anoop Ghanwani, Roseville, CA (US); Joseph LaSalle White, San Jose, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 39 days.

(21) Appl. No.: 15/299,267

(22) Filed: Oct. 20, 2016

(65) Prior Publication Data
US 2018/0115498 A1 Apr. 26, 2018

(51) Int. Cl.
*H04L 12/925* (2013.01)
*H04L 12/873* (2013.01)
*H04L 12/861* (2013.01)

(52) U.S. Cl.
CPC .......... *H04L 47/722* (2013.01); *H04L 47/521* (2013.01); *H04L 49/9052* (2013.01)

(58) Field of Classification Search
CPC ..... H04L 47/72; H04L 47/52; H04L 49/9052; H04L 49/90
See application file for complete search history.

(56) References Cited

U.S. PATENT DOCUMENTS

| | | | |
|---|---|---|---|
| 8,370,496 B1* | 2/2013 | Marr | H04L 67/1031 370/396 |
| 2003/0147347 A1* | 8/2003 | Chen | H04L 12/5602 370/229 |
| 2004/0252685 A1* | 12/2004 | Kagan | H04L 49/251 370/389 |

OTHER PUBLICATIONS

"The Case for An Alternative Link-Level Flow Control Mechanism at High Speeds," URL: http://www.ieee802.org/1/files/public/docs2014/new-ghanwani-llfc-01-14-v01.pdf (15 pgs).
"PFCvs. Credit Based Flow Control Buffer Requirements," URL: http://www.ieee802.org/1/files/public/docs2014/new-dcb-tabatabaee-CBFC-issues-0514.pdf, May 14, 2014 (19 pgs).
"Credit based Link Level Flow Control and Capability Exchange Using DCBX for CEE ports," URL:.
http://www.ieee802.org/1/files/public/docs2014/new-DCB-kamble-FlowControl-0318-v07.pdf, Mar. 17, 2017 (19 pgs).
http://www.ieee802.org/1/files/public/docs2014/new-DCB-kamble-FlowControl-0114-v05.pdf, Jan. 14, 2014 (12 pgs).
"InfiniBand Credit-Based Link-Layer Flow-Control," URL:.
http://www.ieee802.org/1/files/public/docs2014/new-dcb-crupnicoff-ibcreditstutorial-0314.pdf, Mar. 2014 (11 pgs).

* cited by examiner

*Primary Examiner* — Lakeram Jangbahadur
(74) *Attorney, Agent, or Firm* — North Weber & Baugh LLP (57) ABSTRACT

The present invention relates generally to an information handling system. Aspects of the present invention include an adaptive credit-based flow control in an information handling system. In embodiments, a request/grant credit system can be eliminated since the receiver can dynamically allocate credits based on demand at the sender. In embodiments, the sender can provide information related to its queue size to the receiver. The receiver can estimate queue size and demand based on the estimated queue size. In embodiments, the receiver allocates credits based on sender demand.

11 Claims, 10 Drawing Sheets

SYSTEMS AND METHODS FOR ADAPTIVE CREDIT-BASED FLOW

BACKGROUND

Field of Invention

The present invention relates generally to information handling systems and more particularly relates to control flow in information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems provide increasingly more central and critical operations in modern society, it is important that the networks are reliable. One important element in information handling systems is flow control.

Flow control refers to the mechanism to control the transmission speed so that the transmission speed for the sender and receiver match. For example, if the sender can send information quickly, but the receiver is slower, then the fast sender can quickly overwhelm the slower receiver. Therefore, flow control can be employed so that the receiver does not become overwhelmed.

One type of flow control is credit-based flow control. Credit-based flow control uses buffers and credits. Credits indicate availability of receive buffers. In a typical prior art system, the receiver sends credits to the sender indicating the availability of receive buffers. The sender waits for the credits before transmitting messages to the receiver.

Hop-by-hop (or link level) credit-based flow control has been used in Fibre Channel and InfiniB and deployments. There are limitations to credit-based flow control where there is a lot of overhead with the request/grant approach. An alternate method for link level flow control is Priority-based Flow Control (PFC).

Examples of limitations include, once a receiver sends a credit the credit cannot be taken back. Therefore, if the sender does not use the credit, the sender still has the credit limiting the receiver. Also, buffer sharing across ports is not possible. The credits are port specific. Additional credits based on global shared buffer pool availability cannot be done apriori by the receiver because by the time the sender actually uses the credits, the congestion state in the receiver could have changed and the shared buffer pool could have run out of buffers.

Also, the receiver cannot reserve the buffers in the shared buffer pool apriori and allocate them to the sender because the sender may not use those additional credits. Since the credits have already been sent to the sender, the credits cannot be reallocated to a sender on a different port.

Figure 1:
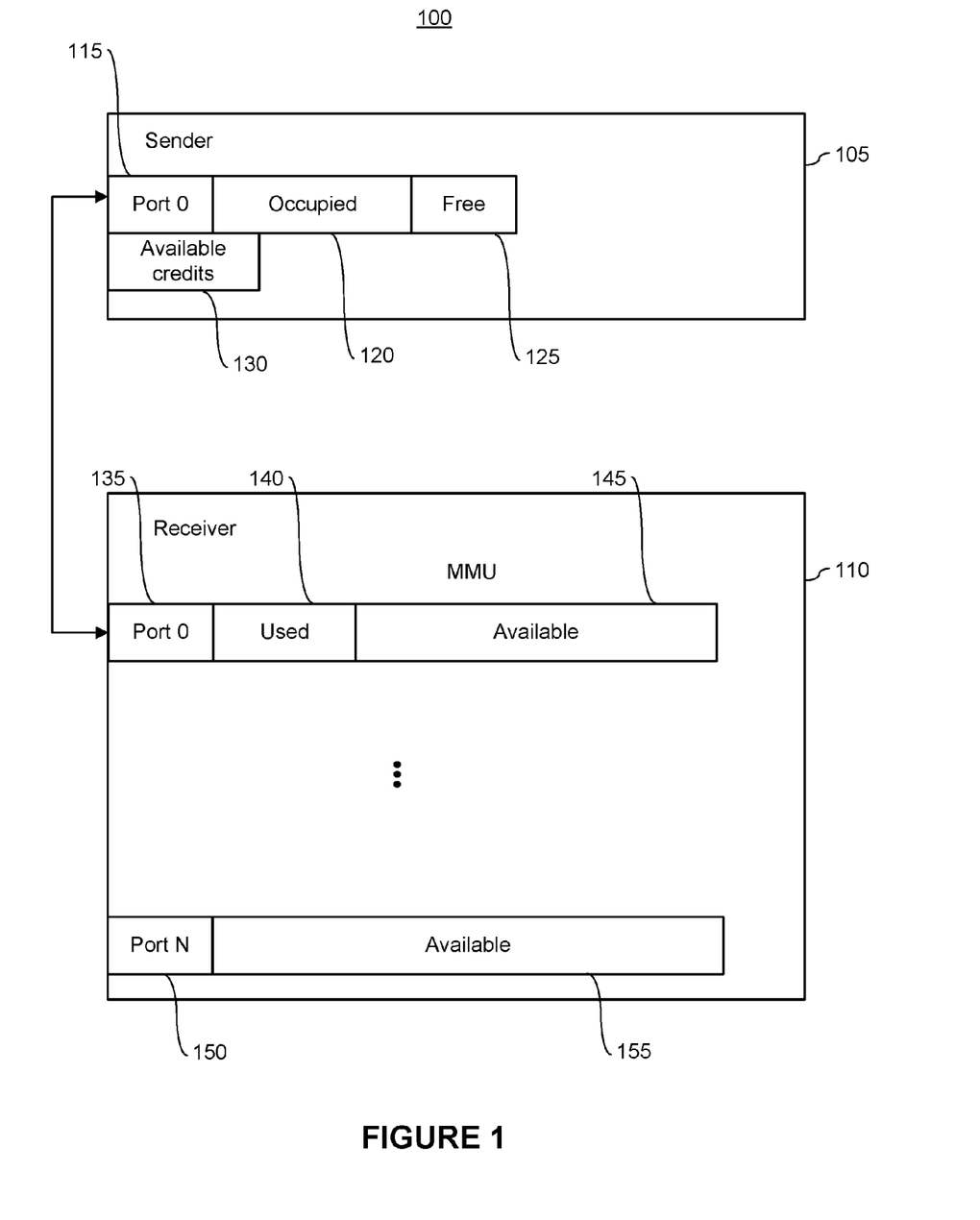
FIG. 1 depicts a prior art credit-based flow control system according to embodiments in this patent document.

FIG. 1 shows an example of a credit-based flow control prior art system. FIG. 1 shows sender and receiver system 100 including sender 105 and receiver 110. Receiver 110 has ports 0 135 through port N 150. Each port has an available buffer space 145 or 155 and some ports have a used buffer portion 140. Receiver 110 can send credits to sender 105. When sender 105 has available credits 130, it can send a message to receiver 110. In this example, each port in the receiver has a fixed buffer. The receiver 110 advertises credits based on available buffer in its fixed buffer pool. When packets egress out of the receiver 110, more buffers are replenished in the fixed buffer pool 145 or 155 and more credits 130 can be advertised to the sender 105.

The sender 105 can transmit data from its queue only if it has enough credits granted by the receiver 130. When packets egress out of the sender 105, the available credits are decremented proportionate to the amount of data transmitted.

FIG. 1 illustrates some of the constraints with a credit-based flow control system. For example, the credits once allocated cannot be taken back. Also, buffer sharing across multiple ports is not possible.

Accordingly, what is needed is to overcome the constraints in a credit-based flow control system, by achieving a more efficient flow control that can achieve lossless transmission.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "packet," "datagram," "segment," or "frame" shall be understood to mean a group of bits that can be transported across a network. These terms shall not be interpreted as limiting embodiments of the present invention to particular layers (e.g., Layer 2 networks, Layer 3 networks, etc.); and, these terms along with similar terms such as "data," "data traffic," "information," "cell," etc. may be replaced by other terminologies referring to a group of bits, and may be used interchangeably.

Furthermore, it shall be noted that: (1) certain steps may optionally be performed; (2) steps may not be limited to the specific order set forth herein; (3) certain steps may be performed in different orders; and (4) certain steps may be done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in the need for an adaptive credit-based flow control system.

It shall also be noted that although embodiments described herein may be within the context of an adaptive credit-based flow control system, the invention elements of the current patent document are not so limited. Accordingly, the invention elements may be applied or adapted for use in other contexts.

Figure 2:
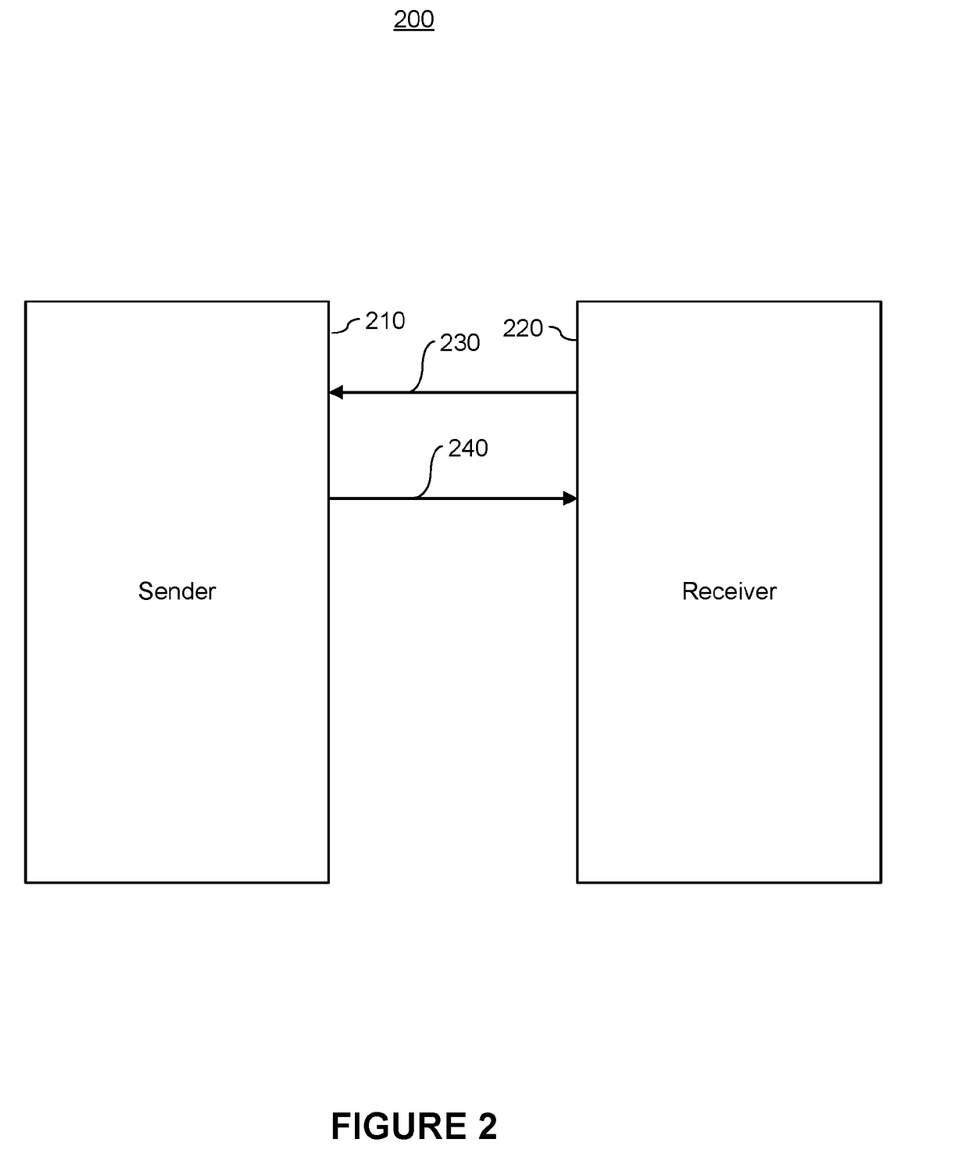
FIG. 2 depicts a block diagram of a sender/receiver system according to embodiments in this patent document.

FIG. 2 depicts a block diagram a sender/receiver system according to embodiments in this patent document. FIG. 2 shows a sender 210 and a receiver 220.

Sender 210 can be any node in an information handling system that can send information, packet, frame, etc. to a receiver 220. Receiver 220 can be any receiving node in an information handling system that receives information, packet, frame, data traffic, etc. Sender and sender node are used interchangeably herein. Receiver and receiver node are used interchangeably herein.

FIG. 2 shows that the receiver 220 sends a credit 230 from the receiver 220 to the sender 210. The sender 210 sends data 240 only if it has an available credit. In embodiments described in this patent document, the sender 210 does not need to ask for a credit, but the receiver 220 can monitor the sender's queue and determine whether a credit is needed as described in reference to FIG. 3.

FIG. 2 depicts a simple system with one receiver 220 and one sender 210. However, one of ordinary skill in the art will understand that a system can have a plurality of senders and a plurality of receivers. Furthermore, each receiver can have a plurality of ports to receive information from any of a plurality of senders. The simplified version of a sender 210 and a receiver 220 is shown for ease of explanation. One of ordinary skill in the art will appreciate that any sender in the system can send to any receiver in the system.

Figure 3:
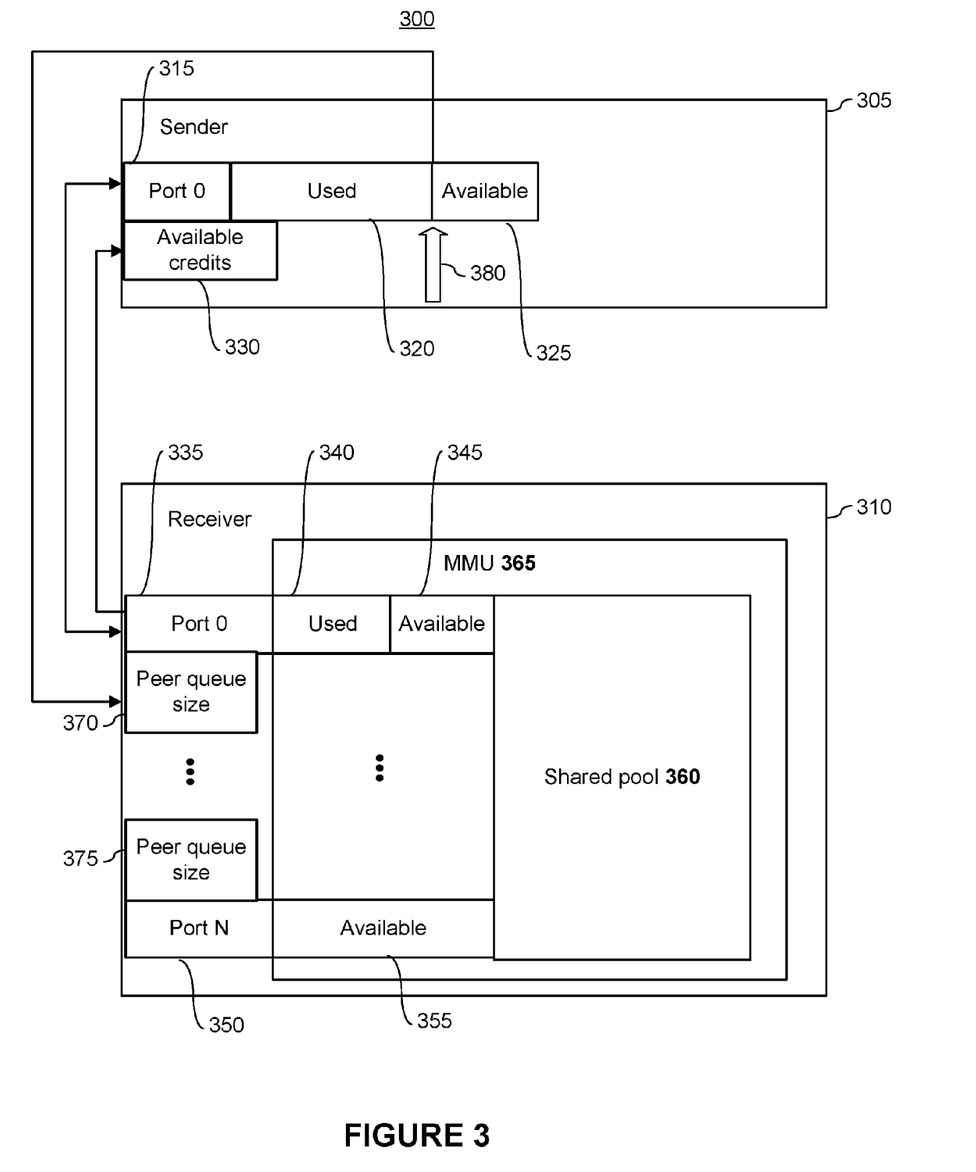
FIG. 3 depicts an adaptive credit-based flow control system according to embodiments in this patent document.

FIG. 3 depicts an adaptive credit-based flow control system according to embodiments in this patent document. FIG. 3 shows a sender 305 and receiver 310. As in the embodiment shown in FIG. 2, the receiver 310 can grant available credits 330 to the sender 305. However, the embodiment shown in FIG. 3 allows for a dynamically allocated shared buffer pool 360 across a plurality of ports in the receiver 310, ports 0 335 to N 350. Each port has a portion of available buffer space 345 and 355 that can be granted by receiver 310. Each port also has access to a shared buffer pool 360 in a memory management unit (MMU) 365.

FIG. 3 shows a sender 305 with port 0 315 and a used 320 and available 325 buffer. The used and available buffers are the buffers that have been used and are available. FIG. 3 also shows sender 305 with available credits 330. Sender 305 can only send information if it has available credits 330. The available credits 330 are granted by the receiver 310 and then advertised to the sender 305.

Memory management unit 365 can be any memory. MMU 365 can include a physical memory and/or a virtual memory. MMU 365 can also comprise the management for translation between physical and virtual memory. MMU 365 can include application specific integrated circuits (ASICs), programmable logic devices (PLDs), flash memory devices, read-only memory (ROM), random-access memory (RAM) devices, and virtual memory devices.

In embodiments, receiver 310 maintains a per port queue size estimate 370, 375. The queue size refers to an estimate of the queue size of the sender 305. The queue size 370, 375 may be reported automatically by sender 305. Each port 335, 350 in the receiver maintains a peer queue size. Therefore, buffer space can be allocated as a function of the sender 305 queue size 370, 375. In FIG. 3 only two ports, port 0 335 and port N 350 are shown. However, one of ordinary skill in the art understands that any number of ports can be used, but are not depicted in the figure for ease of explanation.

In embodiments, a fixed amount 345, 355 of the total buffer 365 can be reserved for each port 335, 350 in the receiver 310. The remaining buffer can be kept in a shared buffer pool 360. The shared buffer pool 360 can be dynamically adaptively allocated to a port based on its demand. The demand is determined by the receiver 310 and stored with the peer queue size 370, 375.

Demand estimator in receiver 310 can compute an estimate of each of its peer links demands and allocate buffers proportionately based on each of the peer's demands. The peer links refers to other nodes that can be sender nodes 305. Receiver 310 can share buffers 360 across ports.

Sharing of the buffer 360 across some or all ports for allocating credits may be done in a variety of ways. One example algorithm may use the following parameters: total available buffer in the shared pool 360, a configurable control of the maximum percentage of the shared buffer 360 a port may use, and amount of buffers already consumed 340 from the shared pool from each port 335, 350.

Receiver 310 uses a demand estimator. Demand estimation for each port may be achieved by allowing each sender 305 to notify each receiver of its peer queue size 370 and 375. Furthermore, each receiver port 335, 350 has a peer queue size 370 associated with port 0 335 and peer queue size 375 associated with port N 350.

In embodiments, demand estimation for each peer can be achieved by allowing each peer to notify its queue state to receiver 310. The sender 305 may notify its raw output queue size 370 and/or notify its rate of change of queue size. The peer queue size 370 and 375 may include either raw instantaneous queue size, rate of change of queue size, some other queue metrics, or any combination.

In embodiments, a notification of the queue size can occur automatically in periodic fashion. The period may be set by a system administrator or by the designer of the system. Alternatively, the notification of the queue size may be triggered when the queue size crosses a threshold. The threshold is depicted in FIG. 3 by arrow 380.

When the sender queue size exceeds the threshold 380 in either instantaneous queue size, rate of change of queue size, or both, the sender may be triggered to update the corresponding peer queue size 370 in receiver 310.

Based on that notification, the receiver 310 maintains an estimate of peer queue size 370 and 375 for each of its peers. In embodiments, this estimate can be an instantaneous value derived from the latest notification. In other embodiments, the estimate can be a weighted average value derived from current and past notifications. In embodiments, the initial estimate of peer queue size can be set to the fixed amount of buffer assigned to the corresponding receiver port 335.

In at least one embodiment, credit allocation is done by the receiver 310 for each peer. Credit allocation may be based on buffer availability 345 in the fixed buffer pool, estimate of peer queue size 370, rate of change of peer queue size estimate, availability of the shared buffer pool 360, and existing allocation and consumption of the shared buffer pool by the peer.

In embodiments, techniques from Fibre Channel credit-based flow control can be used for recovery of lost and stranded credits. For example, use timers at zero credits may be used to initiate a lost credit recovery. As another example a handshake may be used to recover stranded credits. For example, this recovery may use the following: the receiver may send a credit reclaim request, the sender may take the credits out of service and send a reclaim OK response, the credits may be returned to the credit pool.

Each sender 305 may transmit data from its queue only if it has enough available credits 330 from the receiver 310. For each port 335, 350 on the receiver 310, a scheduler runs periodically to grant credits to the sender 305. In one embodiment, the polling frequency of the scheduler can be at least twice as fast as the time it takes to drain the queue of its packet buffers. In other words, it should be at least equal to (2*link rate) or half the time taken to transmit data equivalent to queue size to avoid queue underruns.

In one embodiment as described above, a queue state notification is sent by the sender 305 once when the egress queue size crosses the congestion threshold 380. In one embodiment, a default congestion threshold can be set to the value reserved as fixed buffer for the peer link in receiver 310. The notification message may be sent with the same sampling frequency listed above by default as long as the queue size is above the congestion threshold. Alternatively, this could be overridden by configuration to use different notification intervals.

Receiver 310 updates the value of the corresponding peer queue size 370 estimate based on the notification message from sender 305. In embodiment, receiver 310 advertises the credits to sender 305. In embodiments, in normal operation, the sender 305 does not request any credits. The sender 305 reports the length of the queue for sender 305. In embodiments, the sender 305 also reports the rate of increase of queue length periodically. In embodiments, the sender 305 can report its queue information to the receiver 310 only when an upper threshold 380 is crossed. In embodiments, the sender 305 can stop reporting to the receiver 310 when a lower threshold (not shown) is crossed.

Initially, when a sender node 305 and a receiver node 310 have a link startup, some parameters may be negotiated. These parameters include, sampling period of the queue, reporting mode and associated parameters, report queue length always or only report when the queue length crossed an upper threshold and stop when it goes below the lower threshold, report when the rate of queue length crosses an upper threshold and stop when it goes below the lower threshold. Additionally, the following parameters may be negotiated at link startup: size of each credit buffer, size of metadata used for internal functions within the receiver (for example, the results of classification and lookups) that is appended to each received packet and removed from each packet transmitted, frequency of credit advertisement, default credit units, number of credit class groups, mapping of traffic class to credit class groups, and support for implicit advertisement for default credit units.

In embodiments, the following parameters can be exchanged as part of each credit advertisement: number of credits allocated per credit class group, optional sequence number for every credit message that rolls over after a predetermined period. This sequence number may help ensure synchronization of the credits between the sender and receiver.

In embodiments, optional implicit credit advertisement can be implemented. In order to reduce chattiness on the link an optional extension may treat the advertisement of default queue size (from sender to receiver) and/or default credit units (from receiver to sender) as implicit and not to transmit them on the wire. The sequence number may be tracked for such implicit messages to distinguish between lost credits versus implicit credits.

Figure 4:
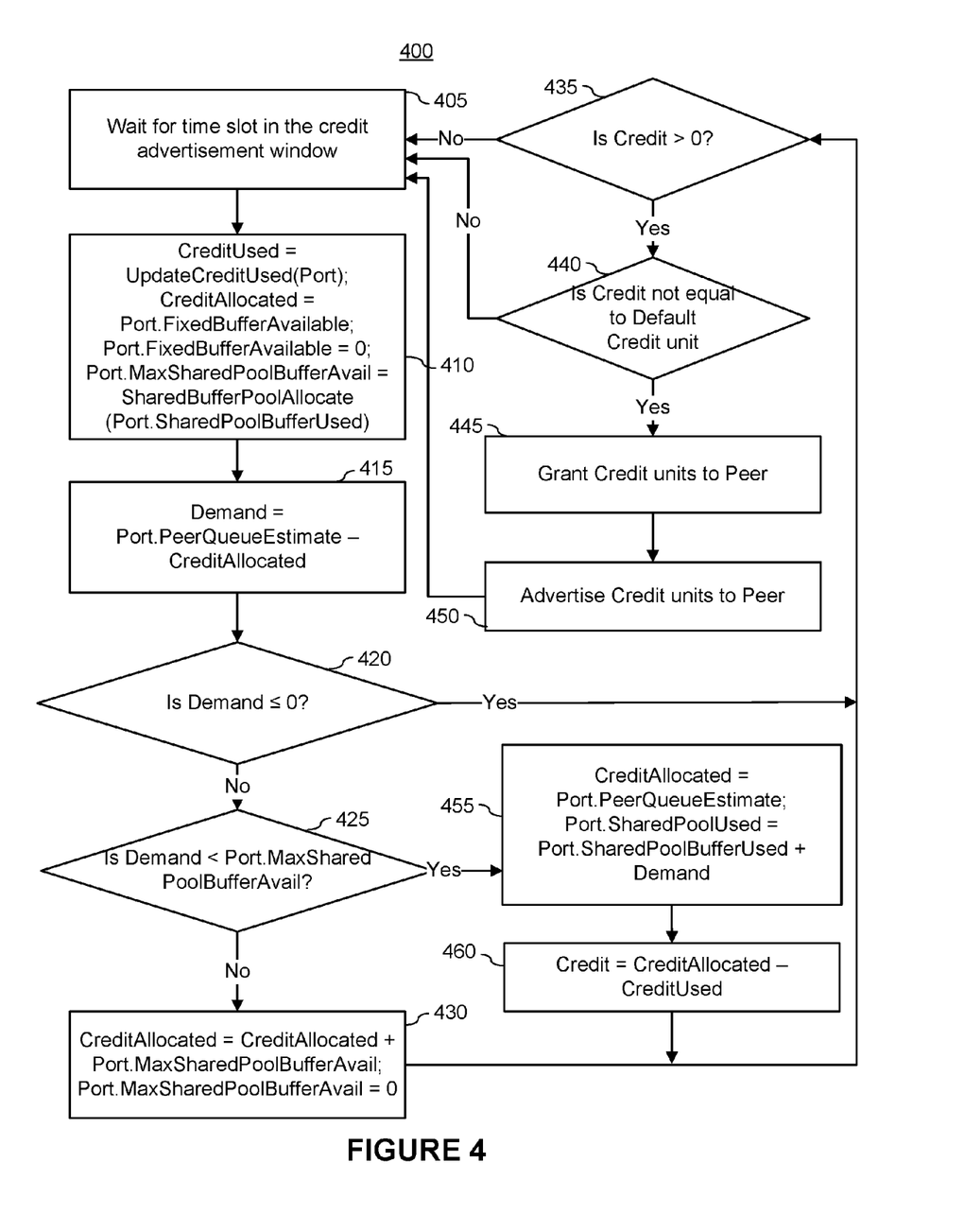
FIG. 4 depicts a flow chart showing a process of adaptive credit-based flow control from the perspective of the receiver according to embodiments in this patent document.

FIG. 4 depicts a flow chart showing a process of adaptive credit-based flow control from the perspective of the receiver according to embodiments. FIG. 4 shows a receiver waiting for a time slot in the credit advertisement window 405. The receiver may implement the process of adaptive credit-based flow control using various variables stored in a memory. In embodiments, different variable names may be selected.

The receiver sets the credit used equal to an updated value of the credits currently in use by that port (e.g., CreditUsed=UpdateCreditUsed(Port)) 410. In embodiments, the credit used can be incremented when a packet is received on the port and decremented when a packet is transmitted out its destination port(s). In embodiments, credit allocated is the amount of credit allocated. In embodiments, the port fixed buffer available is the amount of the fixed buffer that is available for that port. In embodiments, credit allocated can be set equal to a port fixed buffer available (e.g., CreditAllocated=Port.FixedBufferAvailable) 410. The amount of port fixed buffer available can be set to zero (e.g., Port.FixedBufferAvailable=0) 410. The port maximum shared pool buffer available can be set equal to the shared buffer pool allocated to this port based on factors such as the port's occupancy and total occupancy of the shared buffer pool as well as the activity of other ports in the system (e.g., Port.MaxSharedPoolBufferAvail=SharedPoolBufferAllocate(Port.SharedPoolBufferUsed)) 410. The receiver determines demand by looking at the port peer queue estimate and credit allocated 415 (e.g., Demand=Port.PeerQueueEstimate−CreditAllocated). In embodiments, the peer queue estimate is an estimate of the peer queue length.

The receiver determines if there is demand by seeing if demand is less than or equal to 0 (e.g., is Demand≤0?) 420. If demand is less than or equal to zero, then the receiver determines if there are credits 435, by seeing if credit is greater than or equal to zero (e.g., Is Credit>0?) 435.

If demand is not less than or equal to zero, then the receiver checks to see if demand is less than the maximum shared pool buffer available for this port (e.g., Is Demand<Port.MaxSharedPoolBufferAvail?) 425. If the demand is less than the port maximum shared pool buffer available, then credit allocated is set to the port peer queue estimate (e.g., CreditAllocated=Port.PeerQueueEstimate) and the port shared pool used is set to the shared pool buffer used by the port plus the demand (e.g., Port.SharedPoolUsed=Port.SharedPoolBufferUsed+Demand) 455. In embodiments, Credit is the credit that will be advertised to the remote peer. Credit is set to credit allocated minus credit used (e.g., Credit=CreditAllocated−CreditUsed) 460. The receiver also checks if credit is greater than or equal to zero 435.

If the demand is not less than the maximum shared pool buffer available for that port, then credit allocated is set to credit allocated plus the maximum shared pool buffer available for that port (e.g., CreditAllocated=CreditAllocated+Port.MaxSharedPoolBufferAvail) 430. Also, the port maximum shared pool buffer available is set to zero (e.g., Port.MaxSharedPoolBufferAvail=0) 430.

The receiver also checks if credit is greater than or equal to zero (e.g., Is Credit>0?) 435.

If the demand is less than or equal to zero, then the receiver also checks if credit is greater than or equal to zero (e.g., Is Credit>0?) 435. If the credit is not greater than zero, then the receiver waits for a time slot in the credit advertisement window 405.

If the credit is greater than zero, then the receiver checks to see if the credit is not equal to default credit unit (e.g., Is Credit not equal to Default Credit unit?) 440. If not, an implicit advertisement may be used, and then the receiver waits for a time slot in the credit advertisement window 405. If so, then the receiver grants credit units to a peer 445. The receiver also advertises credit units to the peer 450. The receiver also waits for a time slot in the credit advertisement window 405.

Figure 5:
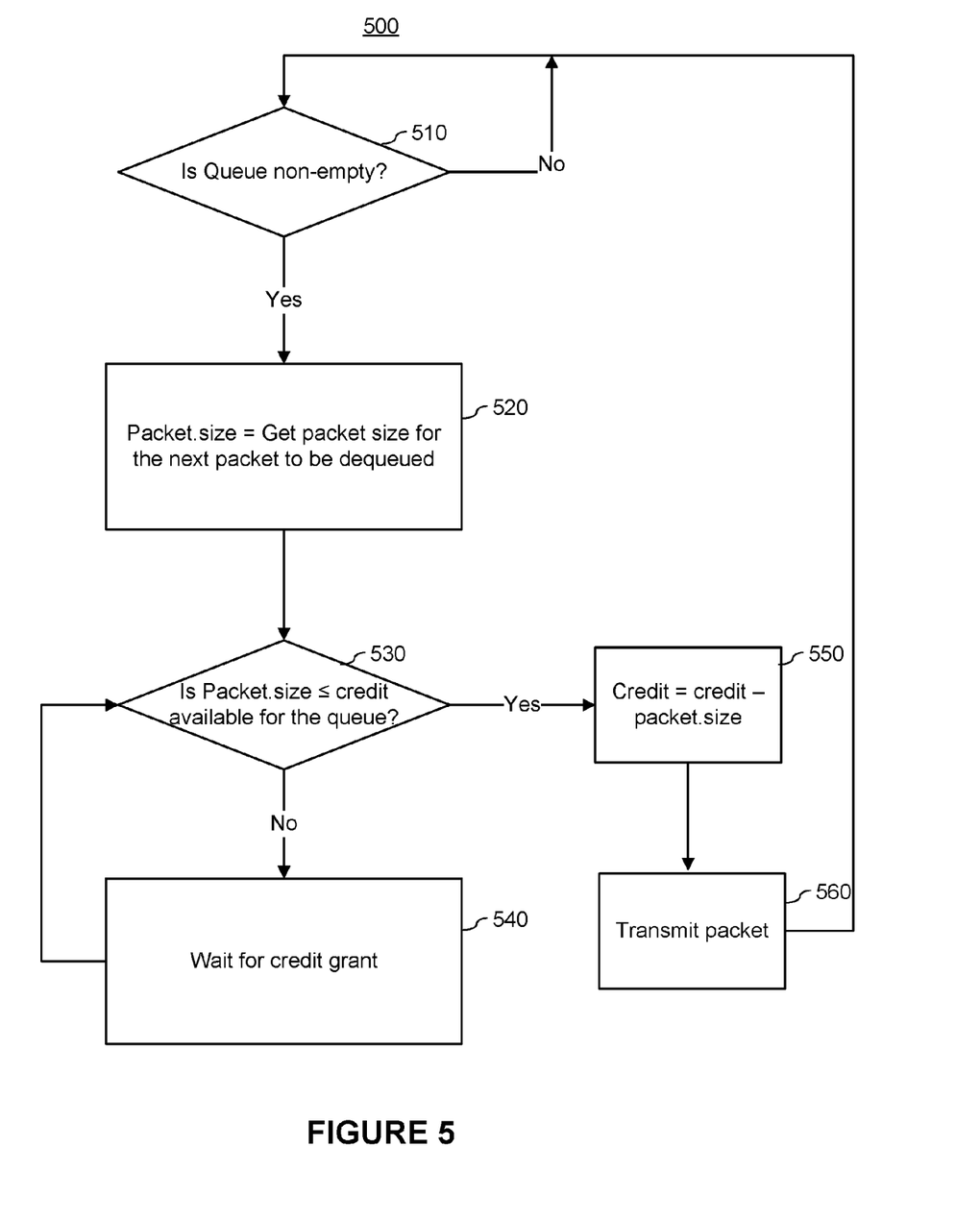
FIG. 5 depicts a flow chart showing a process of adaptive credit-based flow control from the perspective of the sender according to embodiments in this patent document.

FIG. 5 depicts a flow chart showing a process of adaptive credit-based flow control from the perspective of the sender according to embodiments in this patent document. FIG. 5 shows a sender checking to see if a queue is non empty 510. If a queue is not non empty, then the sender continues to check to see if the queue is non empty 510.

If the queue is non empty 510, then the sender gets the packet size for the next packet to be dequeued (e.g., Packet.size=Get packet size for the next packet to be dequeued) 520. The sender checks to see if the packet size is less than or equal to the credits available for the queue (e.g., Is Packet.size≤credit available for the queue?) 530. If the packet size is less than or equal to the credits available, then the sender adjusts the number of credits (e.g., Credit=credit−Packet.size) 550 and transmits the packet 560. The sender then checks the queue to see if it is non-empty 510.

If the packet size is not less than or equal to the credits available 530, the sender waits for credits to be granted 540 and checks the queue size to see if it is non-empty 510.

In embodiments, the adaptive credit-based flow described in this patent document can be used for multiple classes of traffic per port. In those embodiments, the adaptive credit-based flow would be used for each class of traffic on each port. For example, in a system with p ports and n classes of traffic per port, the algorithm would run as if it had (p*n) ports.

Figure 6:
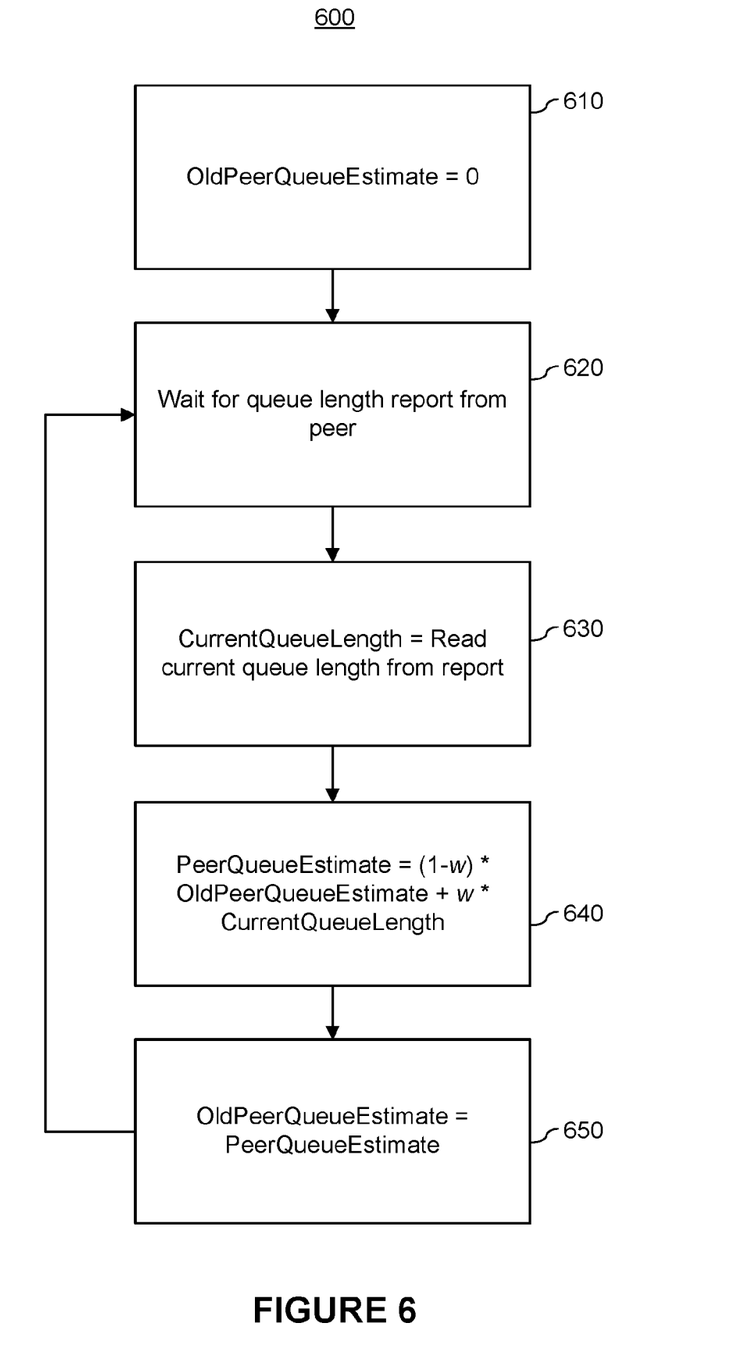
FIG. 6 depicts a flow chart of an algorithm for estimating peer queue size according to embodiments in this patent document.

FIG. 6 depicts a flow chart of an algorithm for estimating peer queue size according to embodiments in this patent document. In embodiments, there can be different algorithms used to compute a peer queue estimate. In embodiments, the peer queue estimate may be based on an instantaneous queue size from peer queue length reports as shown in FIG. 6. For example, a receiver may receive a peer queue estimate report from a peer. The receiver can use the algorithm:

$$PeerQueueEstimate=(1-w)*OldPeerQueueEstimate+w*CurrentQueueLength$$

where PeerQueueEstimate is an estimate for queue size, OldPeerQueueEstimate is the previous peer queue estimate, CurrentQueueLength is the queue size currently reported, and w is a user configurable weight for deciding how much weight the current value of the queue length has on an estimated value.

FIG. 6 shows initializing a previous queue estimate by setting previous queue estimate to zero (e.g., OldPeerQueueEstimate=0) 610. In embodiments, a receiver waits for a queue length report from a peer 620. The current queue length is set to be read from the current queue report (e.g., CurrentQueueLength=Read current queue length from report) 630. The above peer queue estimate can be used (e.g., PeerQueueEstimate=(1−w)*OldPeerQueueEstimate+w*CurrentQueueLength) 640.

PeerQueueEstimate=(1−*w*)*OldPeerQueueEstimate+
*w*\*CurrentQueueLength where PeerQueueEstimate is an estimate for queue size, OldPeerQueueEstimate is the previous peer queue estimate, CurrentQueueLength is the queue size currently reported, and w is a user configurable weight for deciding how much weight the current value of the queue length has on an estimated value.

The previous peer estimate may be set to the current peer queue estimate (e.g., OldPeerQueueEstimate=PeerQueueEstimate) 650. The receiver then waits for the queue length report from a peer 620.

Figure 7:
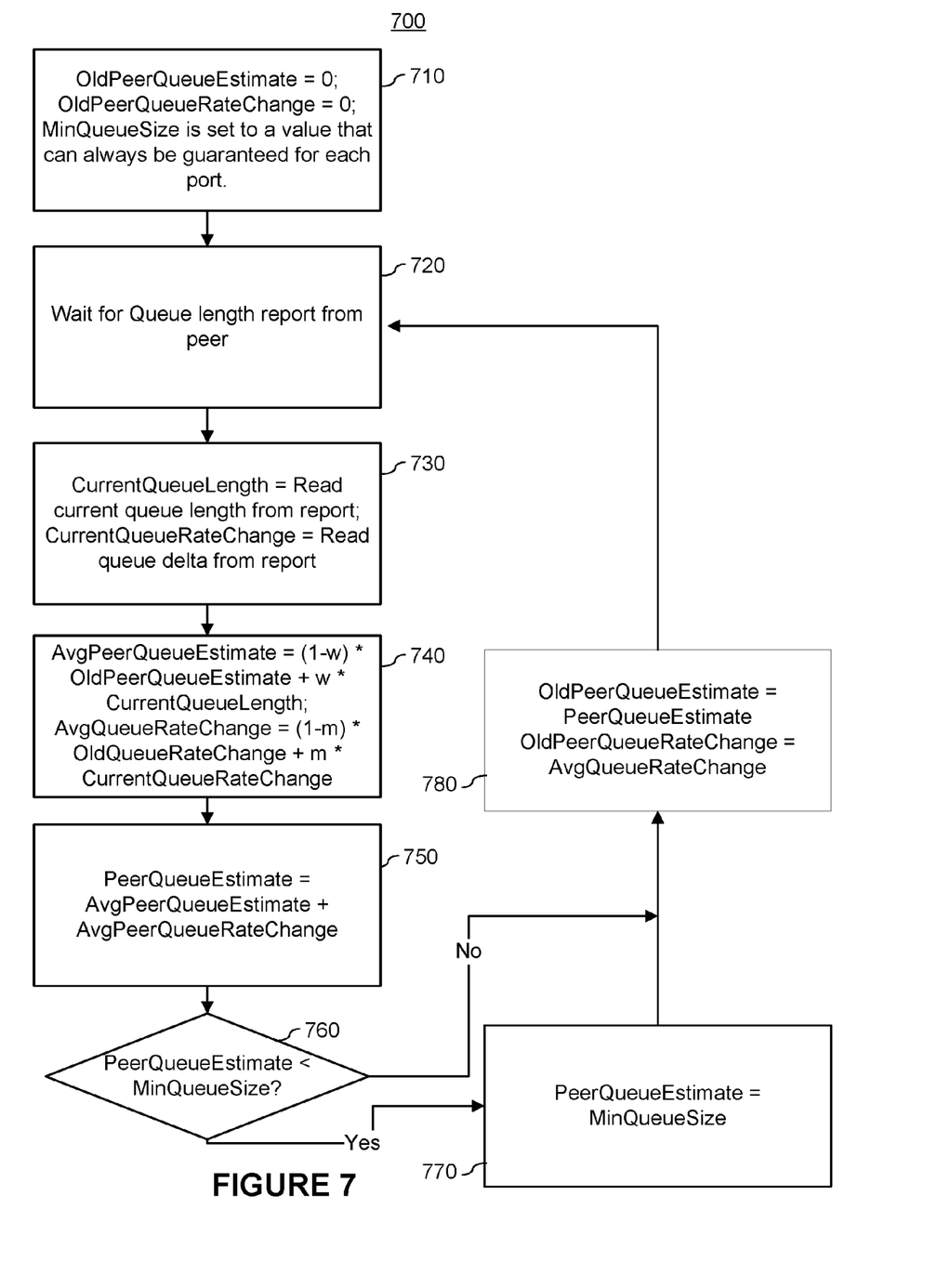
FIG. 7 depicts a flow chart for peer queue size estimation according to embodiments in this patent document.

FIG. 7 depicts a flow chart for peer queue size estimation according to embodiments in this patent document. In embodiments, another algorithm may be used to compute estimated queue length. That algorithm is based on instantaneous queue size and rate of change of queue size from peer length reports.

FIG. 7 shows initializing a previous peer queue estimate and previous queue rate of change by setting them equal to zero (e.g., OldPeerQueueEstimate=0 and OldPeerQueueRateChange=0) 710. Also, a minimum queue size that can always be guaranteed for each port is set, for example, setting minimum queue size to the fixed buffer reserved for each port (e.g., MinQueueSize is set to a value that can always be guaranteed for each port) 710. The receiver waits for a queue length report from a peer 720. In embodiments, the receiver sets the current queue length to read current queue length from the report from the peer (e.g., CurrentQueueLength=Read current queue length from report) 730.

In embodiments, the current queue rate of change is set to the queue difference from the report (e.g., CurrentQueueRateChange=Read queue delta from report) 730. In embodiments, the algorithm 740 used to compute the queue length estimate is similar to the algorithm disclosed in FIG. 6:

AvgPeerQueueEstimate=(1−*w*)*
OldPeerQueueEstimate+*w*\*CurrentQueueLength where OldPeerQueueEstimate is the previous peer queue estimate, CurrentQueueLength is the queue size currently reported, and w is a user configurable weight for deciding how much weight the current value of the queue length has on an estimated value.

Also, the algorithm 740 used to compute the average queue rate of change is:

AvgQueueRateChange=(1−*m*)*OldQueueRateChange+
*m*\*CurrentQueueRateChange where AvgQueueRateChange is an estimate for rate of change of the peer queue, OldQueueRateChange is the previous queue rate of change, CurrentQueueRateChange is the queue rate of change currently reported, and m is a user configurable weight that determines the sensitivity of the current sample of the rate of change of queue size to its historical values with respect to the estimated value.

In embodiments, the peer queue estimate is set to the average peer queue estimate and the average peer queue rate of change (e.g., PeerQueueEstimate=AvgPeerQueueEstimate+AvgPeerQueueRateChange) 750. If the peer queue estimate is less than minimum queue size (e.g., PeerQueueEstimate<MinQueueSize?) 760, then the peer queue estimate is set equal to a minimum queue size (e.g., PeerQueueEstimate=MinQueueSize) 770. If the peer queue size estimate is not less than minimum queue size 760, then the previous peer queue size is set equal to the peer queue estimate (e.g., OldPeerQueueEstimate=PeerQueueEstimate) 780. Also, the previous peer queue rate of change is set equal to the average queue rate of change (e.g., OldPeerQueueRateChange=AvgQueueRateChange) 780. In embodiments, the receiver then waits for the queue length report from a peer 720 again.

Figure 8:
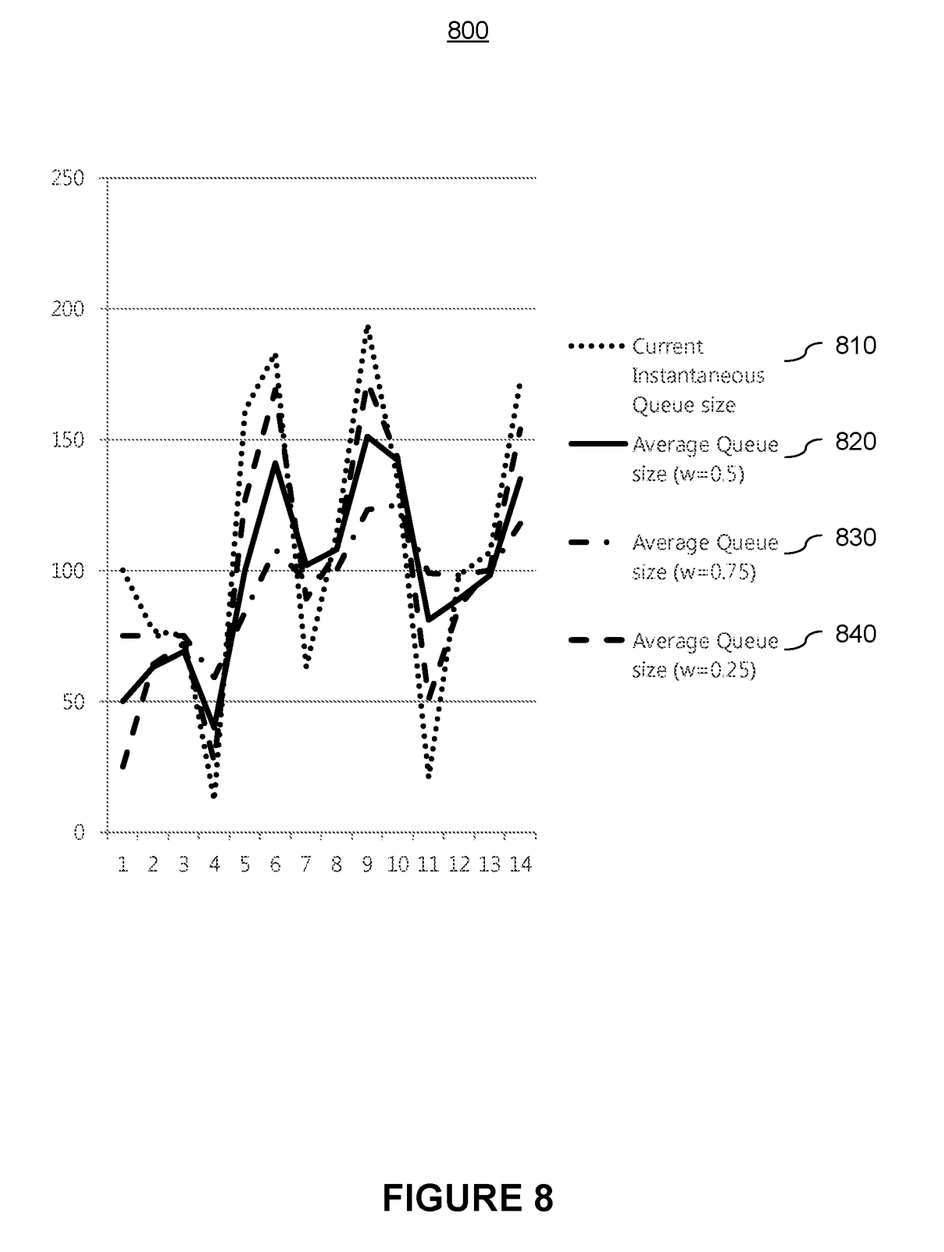
FIG. 8 depicts a plot of average queue size for varying weight, w, according to embodiments in this patent document.

FIG. 8 depicts a plot of average queue size for varying weight, w, according to embodiments in this patent document. FIG. 8 shows four plots showing a different for varying weight, w. Plot 810 shows current queue size and is show in a dotted line. Plot 820 shows an average queue size for w=0.5 and is shown in a solid line in FIG. 8. Plot 830 shows average queue size for w=0.75 and is shown in a dashed, dotted line in FIG. 8. Plot 840 shows an average queue size for w=0.25 and is shown in a dashed line in FIG. 8.

Figure 9:
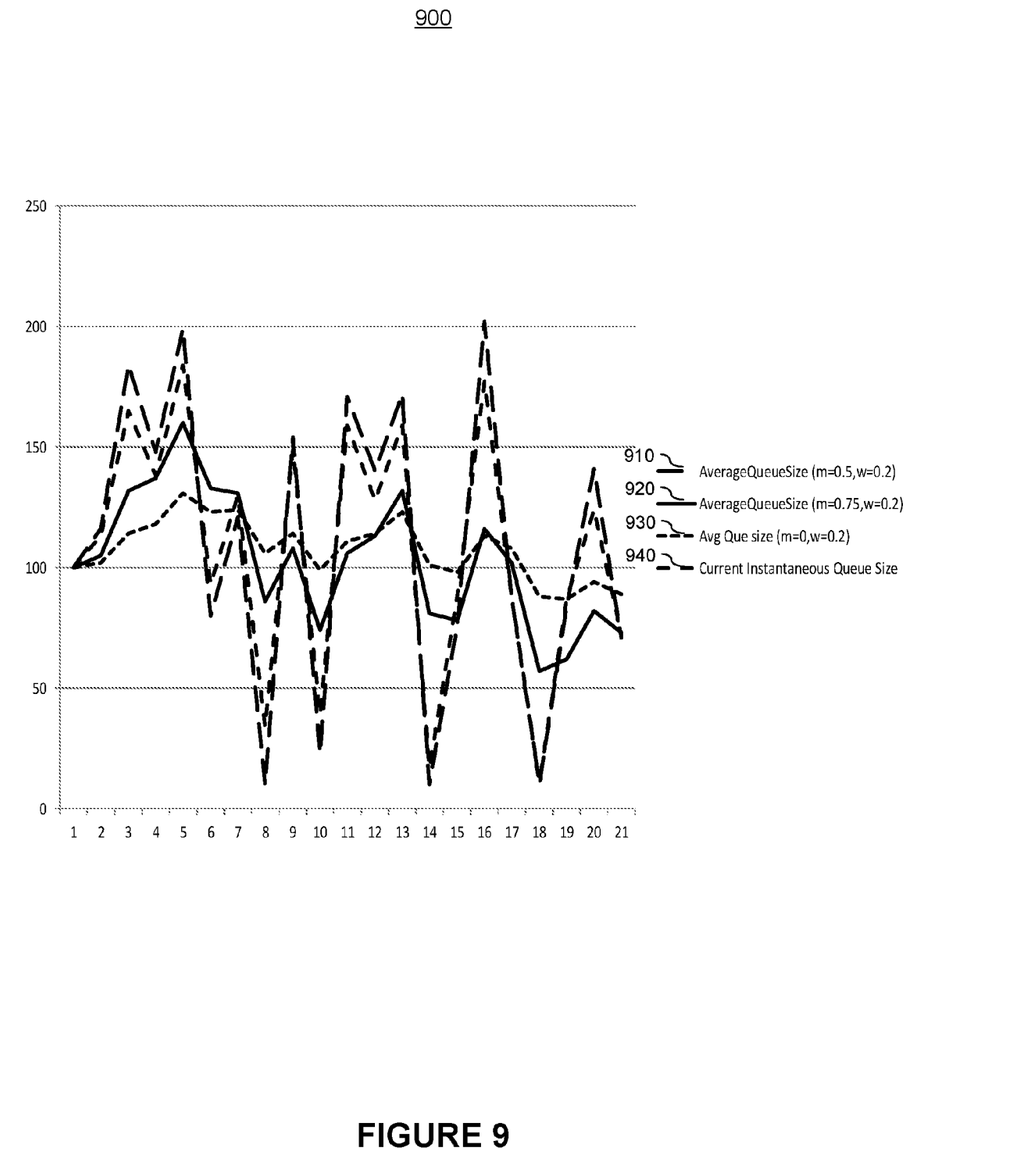
FIG. 9 depicts a plot of average queue size for varying weight, m, according to embodiments in this patent document.

FIG. 9 depicts a plot of average queue size for varying weight, m, according to embodiments in this patent document. FIG. 9 shows four plots of instantaneous queue size and average queue size for varying weights, w and m. Plot 910 shows average queue size for m=0.5 and w=0.2 shown in FIG. 9 as a dashed line. Plot 920 shows average queue size for m=0.75 and w=0.2 shown in FIG. 9 as a solid line. Plot 930 shows average queue size for m=0, w=0.2 and is shown as a short dashed line in FIG. 9. Plot 940 shows current instantaneous queue size and is shown in FIG. 9 as a long dashed line. As one of ordinary skill in the art will appreciate, a larger value of m or a larger value of w will put more weight on the current queue length or change in queue length than the weighted average. These parameters offer tuning knobs.

Figure 10:
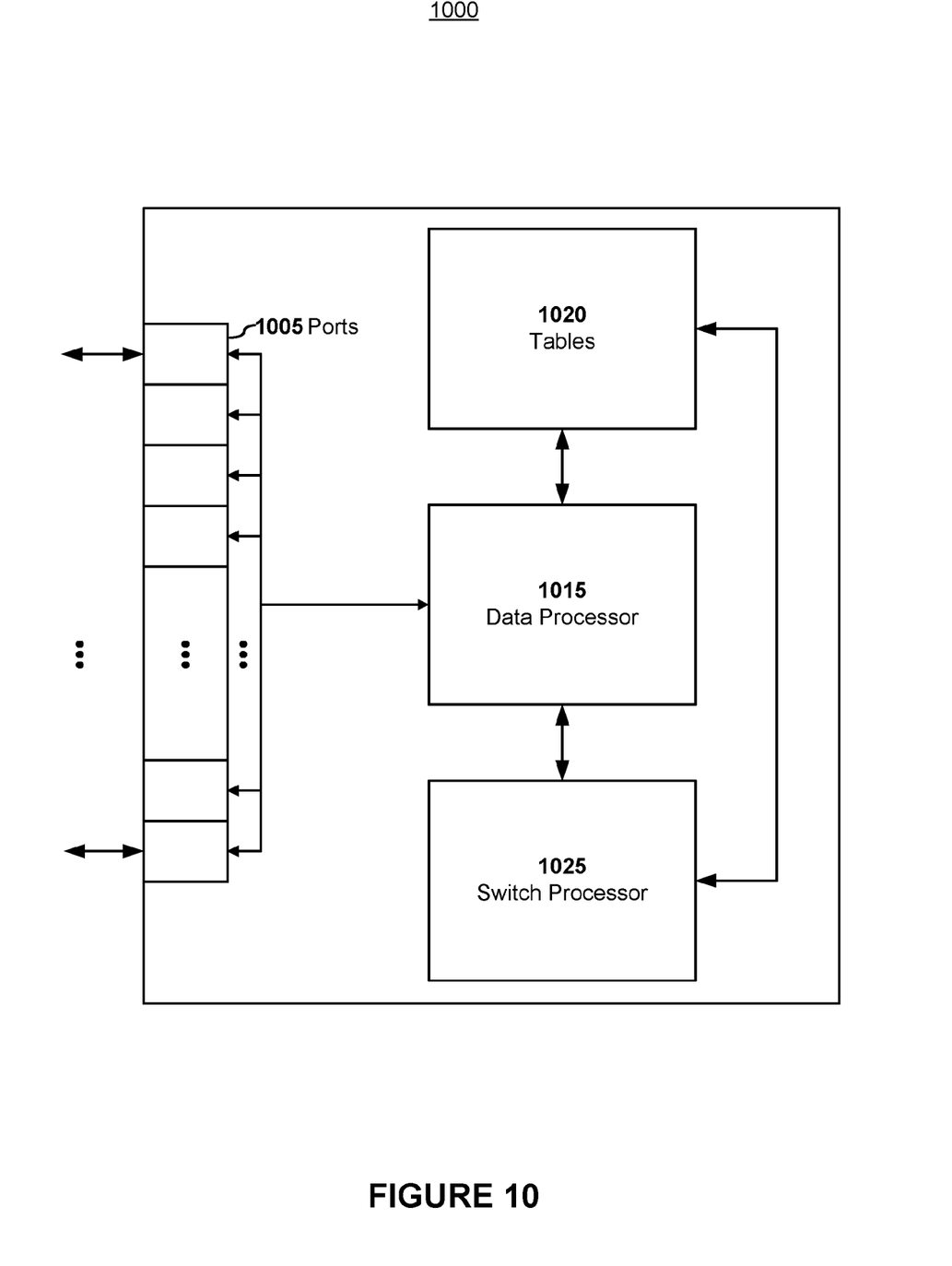
FIG. 10 depicts a block diagram of an information handling system 1000 according to embodiments in this patent document.

FIG. 10 depicts a block diagram of an information handling system 1000 according to embodiments in this patent document. FIG. 10 depicts a block diagram of an information handling system 1000 according to embodiments of the present disclosure. It will be understood that the functionalities shown for system 1000 may operate to support various embodiments of an information handling system—although it shall be understood that an information handling system may be differently configured and include different components. As illustrated in FIG. 10, system 1000 may comprise a plurality of I/O ports 605, a data processing and fabric component or processor 1015, tables 1020, and a switch control functionality processor 1025. In embodiments, the I/O ports 1005 are connected to one or more nodes. The data processing functionality 1015 may use information included in the network data received at the device 1000, as well as information stored in the tables 1020, to identify a next hop for the network data, among other possible activities. In embodiments, the switching fabric then schedules the network data for propagation through the device to an egress port for transmission to the next hop.

In the illustrated system, all major system components may connect to a bus, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments in this patent document address key limitations of the prior art credit-based flow control mechanism. In embodiments, the need to have a request/grant mechanism is removed. Delays due to the synchronization requirements are removed and thereby not impacting the ability to meet line rate forwarding requirements for his speed links. Thus, latency is improved.

In embodiments, a mechanism to provide visibility of queue state of the sender is enabled and buffer sharing across all ports can be implemented on systems that use shared output buffer model.

One of ordinary skill in the art will appreciate that various benefits are available as a result of the present invention.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An information handling system (IHS), the system comprising:
    a plurality of input/output (I/O) ports, which facilitate communications with one or more devices that are communicatively coupled to the IHS;
    a data processing component that processes data traffic via at least one of the plurality of I/O ports;
    an amount of fixed buffer that corresponds with a particular port in the plurality of I/O ports;
    a demand estimator that determines demand; and
    a shared buffer pool at least a portion of which is dynamically allocated to at least one of the plurality of ports based at least in part on at least a portion of the determined demand and availability of buffer credits in the shared buffer pool;
    the IHS being configured:
        when operating as a sender, to determine an amount of available buffer credit and send data traffic based on having buffer credit available, the IHS as the sender also having a queue size representing a size of data traffic that has not been sent and is ready to send; and
        when operating as a receiver, to receive information from a second IHS operating as a sender, the receiver also determines demand based on a queue size associated with second IHS and available buffer credit at the second IHS.

2. The system of claim 1 wherein the queue size is an estimate of a raw queue size.

3. The system of claim 1 wherein the queue size is an estimate of the rate of change of the queue size.

4. The system of claim 1 wherein the shared buffer pool is proportionally dynamically allocated based on the determined demand is based at least in part upon demand of another information handling system that is communicatively coupled to the information handling system estimate and the availability of credits in the shared buffer pool.

5. The system of claim 1, wherein the shared buffer pool is dynamically allocated based on amount of availability of fixed buffer credit.

6. The system of claim 1 wherein the shared buffer pool is dynamically allocated based on allocation and consumption of the shared buffer pool.

7. The system of claim 1 wherein the IHS when operating as a sender further provides information related to queue size to a receiver node responsive to the queue size crossing a predetermined threshold value.

8. The system of claim 1 wherein the IHS when operating as a sender further automatically provides information about queue size to a receiver node at a predetermined periodic interval.

9. A receiver information handling system (IHS), the receiver IHS comprising:
- a plurality of input/output (I/O) ports configured to receive data traffic from a peer IHS;
- a peer queue size estimator configured to automatically receive data related to a queue size of the peer IHS and estimates a peer queue size using the received data related to the queue size of the peer IHS;
- a memory management unit comprising:
  - a fixed memory buffer configured to permit the receiver IHS to grant a buffer credit to the peer IHS; and
  - a shared buffer pool configured to permit the receiver IHS to allocate buffer space from the shared buffer pool across the plurality of ports at the receiver IHS based on at least part of the estimated peer queue size and availability of buffer credits in the shared buffer pool; and
- a scheduler that grants one or more buffer credits to the peer IHS.

10. The node of claim 9 wherein the scheduler runs periodically to grant a one or more buffer credits to the peer IHS.

11. The node of claim 10 wherein the plurality of ports are configured to use one or more classes of traffic.

* * * * *